Oct. 26, 1965  I. W. RUDERMAN  3,213,752
OPTICAL VALVE RESPONSIVE TO INTENSE LIGHT FLASH
Filed March 14, 1961
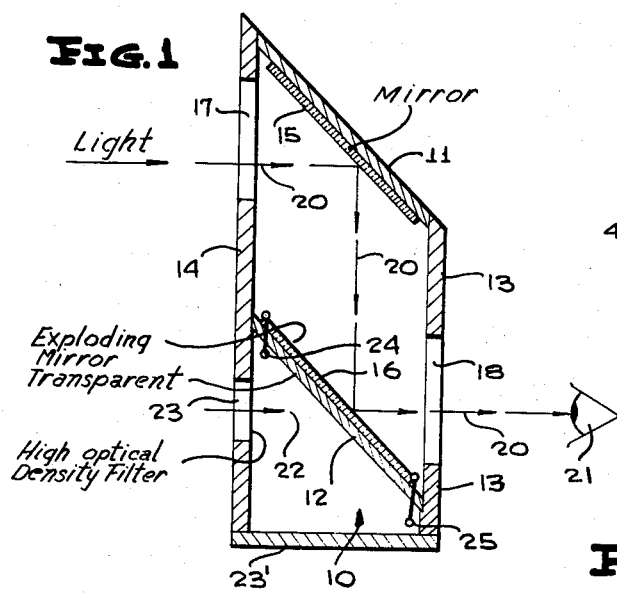
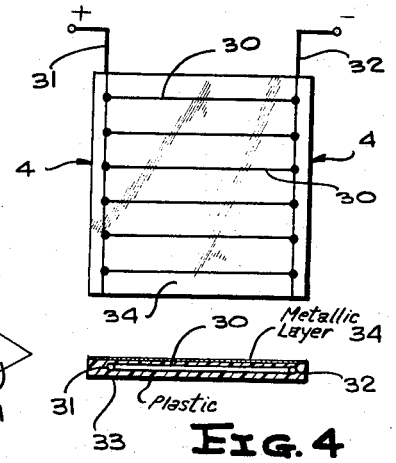
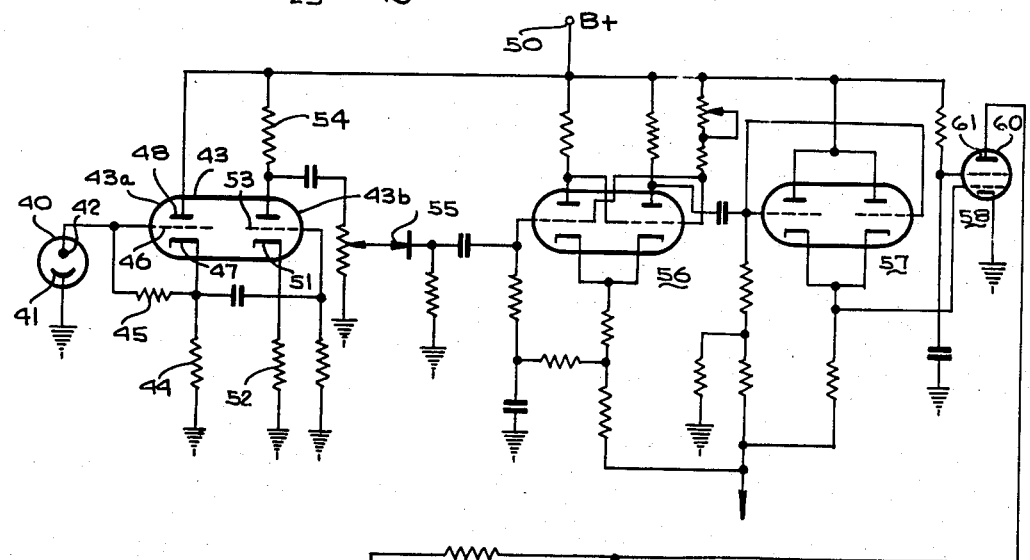
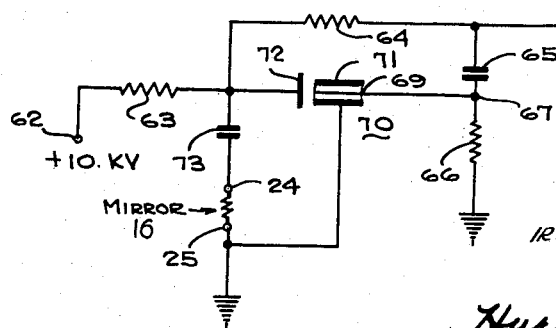
INVENTOR
IRVING WARREN RUDERMAN
BY Hurwitz and Rose
ATTORNEYS United States Patent Office 3,213,752
Patented Oct. 26, 1965

3,213,752
OPTICAL VALVE RESPONSIVE TO INTENSE
LIGHT FLASH
Irving Warren Ruderman, Demarest, N.J., assignor to
Isomet Corporation, Palisades Park, N.J., a corporation
of New Jersey
Filed Mar. 14, 1961, Ser. No. 95,699
16 Claims. (Cl. 88—61)

The present invention relates generally to light valves, and more particularly to light valves capable of extremely rapid transitions from transparent to relatively opaque condition, in response to intense light flashes.

Explosions of atomic and hydrogen bombs are attended by extremely intense flashes of light. Military personnel as far away from the blast as 35 miles are subject to flash blindness or to retinal burn from such atomic flashes.

Flash blindness results from the bleaching of the retinal photosensitive chemicals by intense visible light. The duration of the incapacitation depends upon the brightness of the objects that must be seen after the flash has occurred. The problem is more serious at night than in the day, because at night the pupils will be larger and the visual task will be dimmer. The blink reflex is of little value in protection against flash blindness because of the tremendous intensity of the flash. At night, visual disability will exist for up to half an hour if the visual task is illuminated in a moonless sky. The reflectance of the background and of the atmosphere varies so much that distances at which flash blindness can occur will vary greatly.

Chorioretinal burns are produced by the image of the fireball on the retina. The visible and near infrared light are absorbed by the retinal and choroidal pigment. Such burns can be produced by a nominal bomb to distances of over 35 miles when the air is clear. Unless the fireball image is formed on the macular area the permanent effect will be a scotoma in the peripheral field, and will be in the same position in both eyes, thus giving a symmetrical binocular scotoma. If the image is produced on the macula bilaterally, this will result in a permanent central scotoma with vision reduced to 20/200 (peripheral acuity).

Considerable efforts have been made to develop a shutter or light valve which will provide protection against flash blindness and burns. The requirements for such a device are as follows:

(1) Response time of 50 microseconds or less.
(2) High transmission in the open position and very low transmission with the shutter closed.
(3) Large field of view.
(4) Low weight and bulk.
(5) Reasonable cost.

Electromechanical shutters have been developed which have a lower limit response time of the order of 500 microseconds. They are not fast enough.

Phototropic films appear to have some promise, but none have yet been developed that are faster than the electromechanical shutter.

A preferred embodiment of the present invention comprises a simple periscope in which one or both of the usual mirrored or reflecting surfaces is destroyed in response to a strong flash of light. This may be accomplished by the application of a strong electric field or by an explosive application of electrical power directly to the mirror, or in the vicinity of the mirror, or otherwise. Under these conditions in the open position the user is able to see out of the periscope with little loss in intensity in the device. When the mirrored surface or surfaces are destroyed, however, the line of sight is cut off and the transmission of light to the eye is very small.

It is, accordingly, a broad object of the present invention to provide a rapidly operative light valve, which is normally transparent but which may be rendered relatively opaque in a time of the order of fifty microseconds or less.

It is another object of the present invention to provide a mirror capable of rapid transition from a reflecting to a non-reflecting condition.

A further object of the invention resides in the provision of circuitry for effecting an explosive removal of metal from a base in response to a light flash.

Still a further object of the present invention is to provide a device capable of permitting viewing of the field of an atomic explosion before, after and during the explosion, without damage to the eye caused by the light flash which accompanies the explosion.

The above and still further objects, features and advantages of the present invention will become apparent upon consideration of the following detailed description of one specific embodiment thereof, especially when taken in conjunction with the accompanying drawings, wherein:

FIGURE 1 is a view in section of a periscope, arranged according to a preferred embodiment of the invention, and including an explosive mirror;

FIGURE 2 is a schematic circuit diagram of an electrical system for exploding the explosive mirror of the periscope of FIGURE 1;

FIGURE 3 is a view in plan of a modification of an explosive mirror; and

FIGURE 4 is a view in section taken transversely of FIGURE 3.

Referring now more particularly to the accompanying drawings, the reference numeral 10 denotes a case, fabricated generally of opaque material, preferably, electrically insulative, such as resinous material. The case 10 has a vertical section in the shape of a parallelopiped, i.e. includes parallel top and bottom walls 11 and 12, inclined at 45° to the vertical, in the operative position of the unit, and parallel vertical front and back walls 13 and 14. The case 10 is closed completely at both sides by opaque walls (not shown). The wall 12 is transparent. The remaining walls are opaque.

A mirror 15 is secured to the inside of the upper wall 11. A further mirror, 16, in the form of a metallic foil or coating is secured to the inner surface of wall 12, and renders that wall normally opaque. The mirrors 15 and 16 are parallel and flat, and make an angle of 45° to the vertical in the operative orientation of the device.

An opening 17 is provided in wall 14, co-extensive with or preferably smaller than mirror 15. Similarly, an opening 18 is provided in wall 13, co-extensive with or preferably smaller than mirror 16. A light path 20 then exists, into the case 10 via opening 17, and out of the case 10 via opening 18, to the eye 21 of an observer, the light path 20 having two reflections, due to mirrors 15 and 16. The sizes, shapes and locations of openings 17 and 18 are such, nevertheless, that on removal of either one or both of mirrors 15, 16 the light path 20 is destroyed. However, the wall 12 being transparent, destruction of mirror 16 provides a light path 22 to the eye 21 through wall 12. On this path is placed a high optical density filter 23, i.e. one of very low light transmissibility.

To opposed edges of mirror 16 are connected electrical terminals 24, 25, to which may be applied electrical power for exploding or burning off the mirror 16.

In operation, then, eye 21 normally views a scene via the periscope 10, i.e. via mirrors 15, 16 and openings 17, 18, along optical path 20. On occurrence of an intense flash, such as accompanies an atomic explosion, a high voltage is applied to terminals 24, 25 (in a manner to be explained hereinafter), exploding the mirror 16 and exposing the transparent wall 12. The light now passes through high density optical filter 23, reaching the eye 21 via light path 20. Damage to the eye is prevented, because the latter light path subsists via the high density optical filter 23. The latter is enclosed by walls 23' so that light can reach the eye 21 only via the high density optical filter 23.

In order to increase the field of view of the light valve of FIGURE 1 it may be desirable to use a system of optical lenses in connection with the mirror system.

In FIGURES 3 and 4 is illustrated a modified form of explosive mirror employing a grid of wires 30, corresponding ends of which are joined by leads 31, 32. The wires are embedded in a plastic base 33. A layer of reflective aluminum foil 34, or other thin metallic reflective material, which may be deposited by electro-deposition, on plastic base 33, overlies the wires 30, and provide a mirror. On application of a high voltage to the leads 30, 31 extremely high current traverses these leads, which has an explosive effect on the layer 33, removing same.

Provision (not illustrated) may be made for replacing reflective films or mirrors, which have been exploded off, in any convenient manner, examples of which will be apparent to any skilled mechanic.

Referring now to FIGURE 2 of the accompanying drawings, the reference numeral 40 denotes a photoelectric cell having a grounded cathode 41 and an anode 42. The photoelectric cell 40 may be any photo-conductive device, such as a photo-conductive resistance, if desired, and may be exposed to the flash of light against which protection is desired.

A double triode amplifier 43 is provided, one half of which 43a, is cathode loaded by a resistance 44. A grid leak resistor 45 connects the grid 46 to the cathode 47 of triode 43a. The anode 40 is directly connected to the grid 46. The anode 48 of triode 43a is directly connected to a B+ terminal 50.

The second half 43b of the double triode 43 includes a cathode 51 connected to ground through a bias resistance 52, and a grid 53 A.C. coupled to cathode 47. The triode 43b is anode loaded by resistance 54, and the anode is coupled via an isolating diode 55 to a conventional monostable pulse generator 56. The output of the latter is applied to a cathode follower 57, which in turn supplies a positive pulse to the control grid of an amplifier stage 58.

The amplifier stage 58 utilizes a type 6792 tetrode 60, the anode 61 of which is supplied from terminal 62 (+10 kv.), via a very large load resistance 63 (1 megohm), and a smaller load resistance (100 kv.) 64. The anode 61 is connected to ground via a high voltage capacitor 65 and a very high resistance 66. The junction 67 of capacitor 65 and resistance 66 is connected to one electrode 69 of a spark gap device 70, having a further grounded electrode 71. A further electrode 72 of device 70 is connected to the junction of resistances 63 and 64, to which is also connected the terminal 24, attached to exploding mirror 16 (FIGURE 1). The remaining terminal, 25, is grounded, and a 10 kv. capacitor 73 is connected between electrode 72 and terminal 24.

In operation, the anode 40 is normally slightly positive. When a sharp and intense light flash impinges on photocell 40 the grid of triode 43a goes more negative, since photocell 40 draws current. The values of resistances 45 and 44 are so chosen as to maintain grid 46 about 2 v. negative. When photo-tube 40 is illuminated sufficiently triode 43a is cut-off. Thereby, the grid of triode 43b goes essentially to ground, and its anode rises in potential. The rise time may, in practice, be of the order of one microsecond.

The positive pulse generated by triode 43b is transferred during its rise time, to pulse generator 56, which generates a sharp pulse, for application to cathode follower 57, following which it resets itself. The cathode follower 57 transfers its pulse to the control grid of tetrode 60. The latter is normally non-conductive, which maintains electrode 72 at a high voltage (10 kv.) by virtue of the fact that no voltage drop exists in resistance 63. Electrode 69 is normally at ground potential since no current flows in resistance 66 during quiescent condition. However, the voltage existent on electrode 72, and also across capacitor 73, is inadequate to fire the spark gap device.

When photocell 40 becomes rapidly highly conductive, and a positive pulse is transferred to pulse generator 56, which in turn transfers a positive pulse of fixed amplitude to cathode follower 57, the latter supplies a large positive pulse to the control grid of tetrode 60, rendering the latter highly conductive. The capacitor 65, which is quiescently at 10 kv. now discharges rapidly through tetrode 60. The consequent current flow in resistance 66 raises the potential at point 67 sufficiently to cause a first discharge between electrodes 69 and 71. This first discharge in turn triggers a further discharge, between electrode 72 and electrode 71, of the capacitor 73, the further discharge occurring through the mirror 16 and causing its explosion.

While I have described and illustrated one specific embodiment of my invention, it will be clear that variations of the details of construction which are specifically illustrated and described may be restorted to without departing from the true spirit and scope of the invention as defined in the appended claims.

What I claim is:

1. A mirror comprising an electrically insulating transparent backing, an array of conductors secured to said backing, means providing an electrical circuit commonly through all said conductors and a reflective vaporizable coating superposed on said backing in immediate juxtaposition to said array of conductors.

2. In combination, a mirror; said mirror comprising a first electrically insulating light transparent member, a second electrically conducting member of high light reflectivity secured to said first member; and means for at will applying sufficient power between spaced points on said second member to explode said second member.

3. In combination, a mirror; said mirror comprising a first electrically insulating light transparent member, a second electrically conducting opaque member of high light reflectivity secured over said first member in light blocking relation to said first member, and means for at will applying sufficient current between spaced points on said second member to vaporize and thus remove said second member.

4. In combination, a mirror; said mirror comprising a first electrically insulating light transparent member, a second electrically conducting member of high light reflectivity secured to said member, and means responsive to a predetermined light intensity for applying sufficient power between spaced points on said second member to explode said second member.

5. In combination, a mirror; said mirror comprising a first electrically insulating light transparent member, a second electrically conducting member of high light reflectivity secured to said first member, and means responsive to a predetermined light intensity for applying sufficient power between spaced points on said second member to explode said second member in less than 50 micro-seconds after said intensity is achieved.

6. A periscopic device, comprising a first mirror, a second mirror, an opaque enclosure for said mirrors, said mirrors being mounted within said enclosure, said enclosure including a light entrance aperture aligned with the reflecting surface of only one of said mirrors and a light exit aperture aligned with the reflecting surface of only the other of said mirrors, said light reflecting surfaces being positioned and arranged to transfer light from said entrance aperture to said exit aperture only by reflection from both said light reflecting surfaces, and means for substantially eliminating the reflections of at least one of said reflecting surfaces in response to an electrical signal.

7. The combination according to claim 6, wherein said last means includes means for substantially removing said at least one of said reflecting surfaces in response to said electrical signal.

8. The combination according to claim 6, wherein said at least one of said reflecting surfaces is a metallic layer substantially instantaneously vaporizable in response to said electrical signal.

9. The combination according to claim 8 wherein said other of said mirrors includes said metallic layer, said other of said mirrors further including a transparent plate supporting said metallic layer, and a further light aperture in said enclosure located in a direct path with said exit aperture via said transparent plate and said metallic layer, said further light aperture being optically blocked by a high optical density filter.

10. The combination according to claim 7 wherein is provided a photoelectric device arranged to provide said electrical signal only in response to occurrence of an intense flash of light.

11. The combination according to claim 10 wherein said photoelectric device includes a photosensitive device, a monostable pulse generator in cascade with said photosensitive device and arranged to generate a pulse in response to predetermined illumination of said photosensitive device, and a voltage triggered arc discharge device responsive to said pulse.

12. A periscopic device including a pair of mirrors having parallel and opposed reflecting surfaces inclined at an angle of approximately 45° with respect to a light ray and a viewing position, and means for substantially instantaneously reducing the reflectivity of at least one of said mirrors, said at least one of said mirrors including a transparent plate and a reflecting metallic coating, said coating being preponderantly removable in response to application of heat thereto, wherein is provided a slightly transparent light filter in the path of a light path commencing antecedent to said one of said mirrors and extending therethrough, and wherein is provided a photoelectric device arranged to provide an electrical signal in response to occurrence of an intense flash of light, and means responsive to said electrical signal for applying heat to said coating.

13. A periscopic device including a pair of mirrors having parallel and opposed reflecting surfaces inclined at an angle of approximately 45° with respect to a light ray and a viewing position, and means for instantly reducing the reflectivity of at least one of said mirrors in response to an electrical signal, wherein said one of said mirrors includes a transparent plate and a reflecting metallic coating, said coating being preponderantly removable in response to application of heat thereto, wherein is provided a slightly transparent light filter in a path of a light path commencing antecedent to said one of said mirrors and extending therethrough, wherein is provided a photoelectric device arranged to provide said electrical signal only in response to occurrence of an intense flash of light, and wherein said photoelectric device includes a monostable pulse generator in cascade with a photosensitive cell and arranged to generate a pulse in response to predetermined illumination of said photosensitive cell, and a voltage triggerd arc discharge device responsive to said pulse, for applying heat to said coating through an electrical discharge.

14. A viewing device to prevent damage in response to a bright light flash comprising first and second reflectors, said reflectors being positioned so that a light path from the flash to the eye exists only via both reflectors, and means for reducing the reflectivity of one of said reflectors in response to said bright light flash, wherein said means for reducing includes means for vaporizing said one reflector.

15. A viewing device to prevent damage in response to a bright light flash comprising first and second reflectors, said reflectors being positioned so that a light path from the flash to the eye exists only via both reflectors, and means for reducing the reflectivity of one of said reflectors in response to said bright light flash, wherein said means for reducing includes means for vaporizing said one reflector, and wherein said reflector includes a metallic segment and said means for vaporizing includes a spark gap and a discharge capacitor connected to said segment.

16. A device for viewing a randomly occurring intense light flash, comprising means providing a normally light conducting path intermediate the point of origin of said flash and a viewing position, said means including a light valve transformable from normally transparent to opaque condition in response to an electrical signal, said light valve including a layer of metallic light reflecting material vaporizable in response to application of electrical power, and means for breaking said light path comprising means responsive to said electrical signal for applying said electrical power to said light reflecting material.

References Cited by the Examiner

UNITED STATES PATENTS

| | | | |
|---|---|---|---|
| 1,616,279 | 2/27 | Parodi | 88—57 |
| 2,401,443 | 6/46 | Weinrich | 88—69 |
| 2,403,730 | 7/46 | MacNeille | 88—1 |
| 2,470,139 | 5/48 | Campbell | 95—53 X |
| 2,750,832 | 6/56 | Morgan | 88—61 |
| 2,792,752 | 5/57 | Moncrieff-Yeates et al. | 88—61 |
| 3,008,374 | 11/61 | Kriesman | 88—61 |

FOREIGN PATENTS

| | | |
|---|---|---|
| 187,271 | 10/22 | Great Britain. |
| 702,000 | 1/54 | Great Britain. |

OTHER REFERENCES

Electronics, "Faraday Shutter Freezes Transient," February 1954, pages 198, 200 and 202.

Edgerton et al.: "Rapid-Closing Electronically-Operated Shutter," Review of Scientific Instruments, vol. 27, No. 3, March 1956.

Corning Glass Product Information Bulletin IC-T, "Pyrex Brand E-C Heated Mirror," November 2, 1959 (4 pages).

Muirhead et al.: "Rapid-Opening Electronically Operated-Shutter," Review of Scientific Instruments, vol. 32, No. 10, October, 1961, pages 1148 and 1149.

Jenkins et al.: "Optical Transmission Measurement of an Anti-Flash System," Nuclear Science Abstracts, vol. 15, No. 3, Feb. 15, 1961, page 366.

JEWELL H. PEDERSEN, *Primary Examiner.*

WILLIAM MISIEK, *Examiner.*